(12) United States Patent
Frisch (10) Patent No.: US 7,954,275 B2
(45) Date of Patent: Jun. 7, 2011

(54) RODENT TRAP WITH REMOVABLE TRIGGER PLATE

(75) Inventor: Steven Frisch, Brooklyn, NY (US)

(73) Assignee: AP&G Co., Inc., Brooklyn, NY (US)

( * ) Notice: Subject to any disclaimer, the term of this patent is extended or adjusted under 35 U.S.C. 154(b) by 0 days.

(21) Appl. No.: 12/383,223

(22) Filed: Mar. 20, 2009

(65) Prior Publication Data

US 2010/0199544 A1 Aug. 12, 2010

Related U.S. Application Data

(60) Provisional application No. 61/150,892, filed on Feb. 9, 2009.

(51) Int. Cl.
*A01M 23/30* (2006.01)
*A01M 23/00* (2006.01)

(52) U.S. Cl. .............................. 43/81; 43/114

(58) Field of Classification Search ............ 43/81, 81.5, 43/82, 83, 83.5, 88, 90–97, 114
See application file for complete search history.

(56) References Cited

U.S. PATENT DOCUMENTS

| | | | | |
|---|---|---|---|---|
| 1,464,559 A | * | 8/1923 | Britan | 43/81 |
| 2,152,034 A | * | 3/1939 | Fowler | 426/1 |
| 2,190,089 A | * | 2/1940 | Sund | 43/81 |
| 2,263,161 A | * | 11/1941 | Brust | 43/81 |
| 2,595,019 A | * | 4/1952 | Sullivan | 426/1 |
| 2,858,638 A | * | 11/1958 | Horenstein | 43/81 |
| 3,055,140 A | * | 9/1962 | McAllister | 43/81 |
| 3,823,505 A | * | 7/1974 | Holt | 43/81.5 |
| 3,968,589 A | * | 7/1976 | Basham | 43/81 |
| 4,030,230 A | * | 6/1977 | Souza | 43/81 |
| 4,127,958 A | * | 12/1978 | Peters et al. | 43/81 |
| 4,212,128 A | * | 7/1980 | Vance | 43/81 |
| 4,306,369 A | * | 12/1981 | Margulies | 43/81 |
| 4,472,904 A | * | 9/1984 | Wasielewski | 43/81 |
| 4,677,786 A | * | 7/1987 | Frank | 43/82 |
| 4,711,049 A | * | 12/1987 | Kness | 43/81 |
| 4,719,718 A | * | 1/1988 | Kon | 43/81 |
| 4,779,374 A | * | 10/1988 | Feldman | 43/81 |
| 4,803,799 A | * | 2/1989 | Vajs et al. | 43/82 |
| 5,001,857 A | * | 3/1991 | McDaniel et al. | 43/81 |
| 5,024,183 A | * | 6/1991 | Baer | 43/81 |
| 5,172,512 A | * | 12/1992 | Bodker et al. | 43/81 |
| 5,337,512 A | * | 8/1994 | Krenzler | 43/82 |
| 5,375,367 A | * | 12/1994 | Pust | 43/81 |
| 5,477,635 A | * | 12/1995 | Orsano | 43/81 |
| 5,488,800 A | * | 2/1996 | O'Hara | 43/81 |
| 5,546,696 A | * | 8/1996 | Parker, Jr. | 43/81 |
| 6,050,024 A | * | 4/2000 | Manno | 43/81 |
| 6,119,391 A | * | 9/2000 | Maconga | 43/81 |

(Continued)

FOREIGN PATENT DOCUMENTS

EP 1300077 A2 * 4/2003

(Continued)

*Primary Examiner* — Darren W Ark (74) *Attorney, Agent, or Firm* — Malina & Associates, PLLC (57) ABSTRACT

A rodent trap includes a pivotally mounted jaw which snaps to a closed position to enclose a rodent when activated by a rodent attempting to free itself from an adhesive coated removable trigger member. The trigger member and the rodent can be easily removed from the trap. The trigger member can be replaced with a new trigger member and the trap can be reset and reused.

4 Claims, 15 Drawing Sheets

U.S. PATENT DOCUMENTS

| | | | |
|---|---|---|---|
| 6,137,415 A * | 10/2000 | Rast | 43/81 |
| 6,282,832 B1 * | 9/2001 | Manno | 43/81 |
| 6,415,544 B1 * | 7/2002 | Leyerle et al. | 43/82 |
| 6,508,031 B1 * | 1/2003 | Johnson et al. | 43/88 |
| 6,574,912 B1 * | 6/2003 | Johnson | 43/88 |
| 7,117,631 B2 * | 10/2006 | Peters | 43/81 |
| 7,162,832 B2 * | 1/2007 | Simpson et al. | 43/81 |
| 7,712,246 B2 * | 5/2010 | Desmither | 43/81 |
| 2007/0289200 A1 * | 12/2007 | Danielsson | 43/82 |
| 2009/0241409 A1 * | 10/2009 | Dylla | 43/81 |
| 2009/0249680 A1 * | 10/2009 | Watson et al. | 43/81 |
| 2010/0115824 A1 * | 5/2010 | Frisch | 43/81 |
| 2010/0154288 A1 * | 6/2010 | Frisch | 43/81 |

FOREIGN PATENT DOCUMENTS

| | | | |
|---|---|---|---|
| EP | 1731033 A1 * | 12/2006 | |
| GB | 2209113 A * | 5/1989 | |
| WO | WO 8605948 A1 * | 10/1986 | |
| WO | WO 0209512 A1 * | 2/2002 | |
| WO | WO 2004095920 A1 * | 11/2004 | |

* cited by examiner

RODENT TRAP WITH REMOVABLE TRIGGER PLATE

RELATED APPLICATIONS

The present application claims priority from Provisional Patent Application Ser. No. 61/150,892, filed on Feb. 9, 2009, entitled "Rodent Trap With Removable Trigger Plate."

FIELD OF THE INVENTION

The present invention relates generally to the field of rodent traps and more particularly, to a rodent trap with a removable trigger plate.

BACKGROUND OF THE INVENTION

The prior art related to rodent control includes various examples in which bait is placed on a trigger plate to attract a rodent. Movement of the trigger plate by a rodent causes a spring loaded member to trap the rodent. In prior art traps, after the trap has been activated, the user disposes of the trap along with the rodent. The need to dispose of the trap after a one-time use is both costly and inconvenient for professional sanitarians who typically utilize a large number of traps in order to clear rodents from a large industrial facility.

Another problem found in prior art rodent traps is related to the situation in which the bait which has been placed on the trigger plate is often removed from the trap by a rodent without activation of the trap. This renders the trap useless for rodent removal.

The above problems are clearly evidenced in a typical prior art rodent trap such as the trap shown in U.S. Pat. No. 6,415,544 to Leyerle, et al, for "Rodent Trap With Entrapping Teeth." In this trap, the entire trap is disposed of along with the entrapped rodent.

OBJECTS AND SUMMARY OF THE INVENTION

It is an object of the present invention to provide a rodent trap with a removable trigger plate in which the possibility of removing the bait without activating the trap is significantly reduced.

Another object of the present invention is to provide a rodent trap with a removable trigger plate in which the removable trigger plate facilitates continued reuse of the trap.

Another object of the present invention is to provide a rodent trap with a removable trigger plate which includes an adhesive layer which ensures that motion of the rodent attempting to escape from the trap is transferred to the trap and ensures activation of the trap.

Another object of the present invention is to provide a rodent trap with a removable trigger plate which includes an early removable and replaceable member having an adhesive layer.

Yet another object of the present invention is to provide a rodent trap with a removable trigger plate which includes a relatively small number of component parts which can be manufactured economically in volume resulting in a relatively low unit cost.

Other objects and a more complete understanding of the present invention will be made clear hereinafter.

In accordance with the present invention, there is provided a rodent trap with a removable trigger plate which includes a pivotally mounted jaw which snaps to a closed position to enclose a rodent when activated by the rodent attempting to free itself from an adhesive coated removable trigger. The trigger plate and the rodent can be easily removed from the trap. The trigger plate can be easily replaced with a like trigger plate and the trap can be reset and reused.

In an alternative embodiment of the present invention, the trigger includes a removable member which has an adhesive layer. The removable member and the rodent can be easily replaced with a like member and the trap can be reset and reused.

Additional objects, features and advantages of the invention will be apparent from the following detailed description when taken in conjunction with the accompanying drawings.

DESCRIPTION OF THE INVENTION

Figure 1:
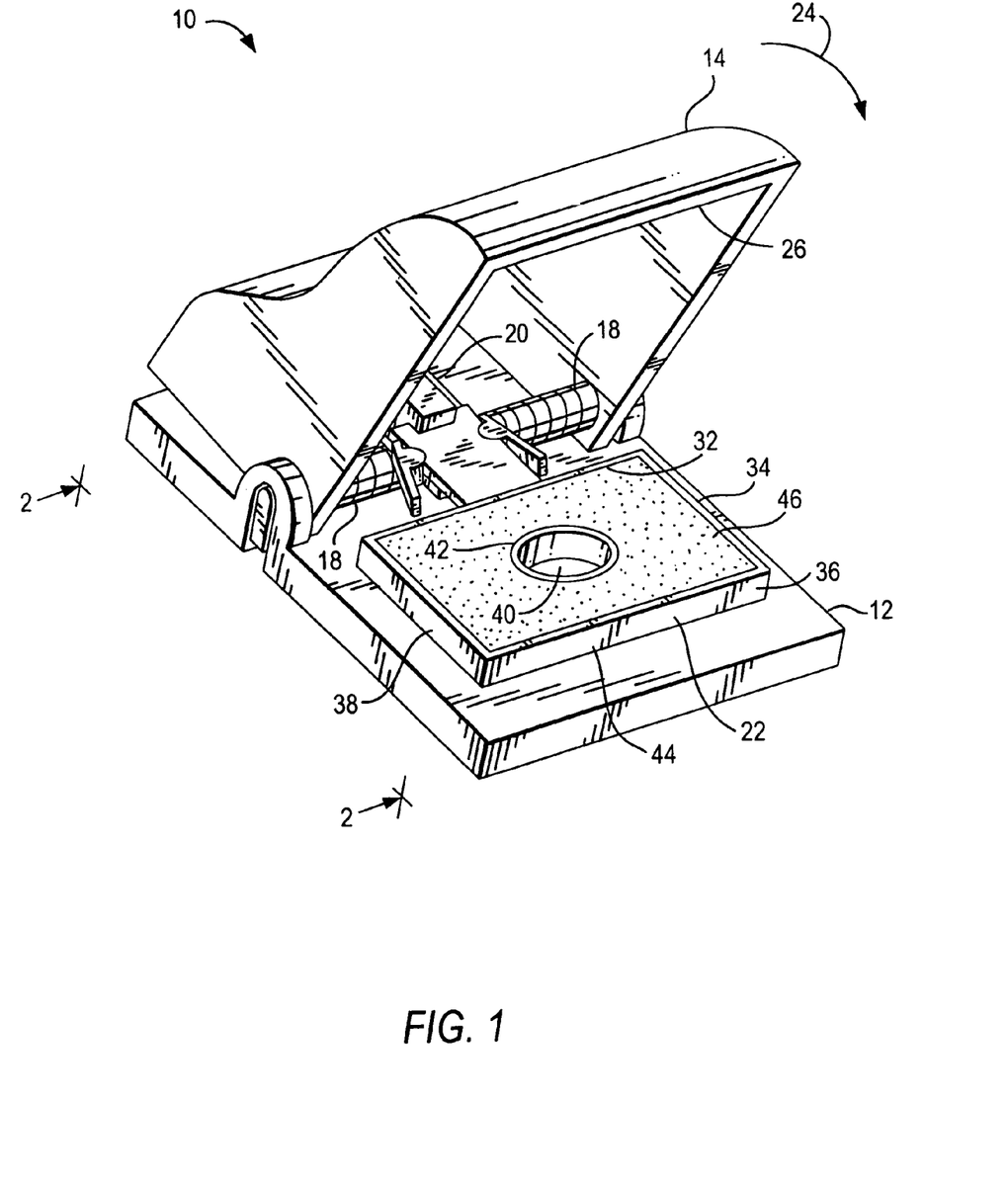
FIG. 1 is an overall perspective view of a rodent trap with a removable trigger.

FIGS. 1-8 show a first embodiment of a rodent trap with a removable trigger 10. The trap 10 includes a base 12, a hollow jaw 14 pivotally mounted on the base 12, a catch mechanism 16, a pair of load springs 18, a trigger support 20 and a removable trigger 22. The catch mechanism 16 engages the trigger support 20 and maintains the trap 10 in the open or set position as shown in FIG. 1. When the removable trigger 22 is moved by a rodent, the trigger support 20 becomes disengaged from the catch mechanism 16 and the catch mechanism 16 releases the jaw 14 allowing the spring 18 to quickly pivot the jaw 16 in the direction shown by the arrow 24 in FIG. 1 toward a closed position in which the edge 26 of the jaw 14 contacts the base 12.

Figure 2:
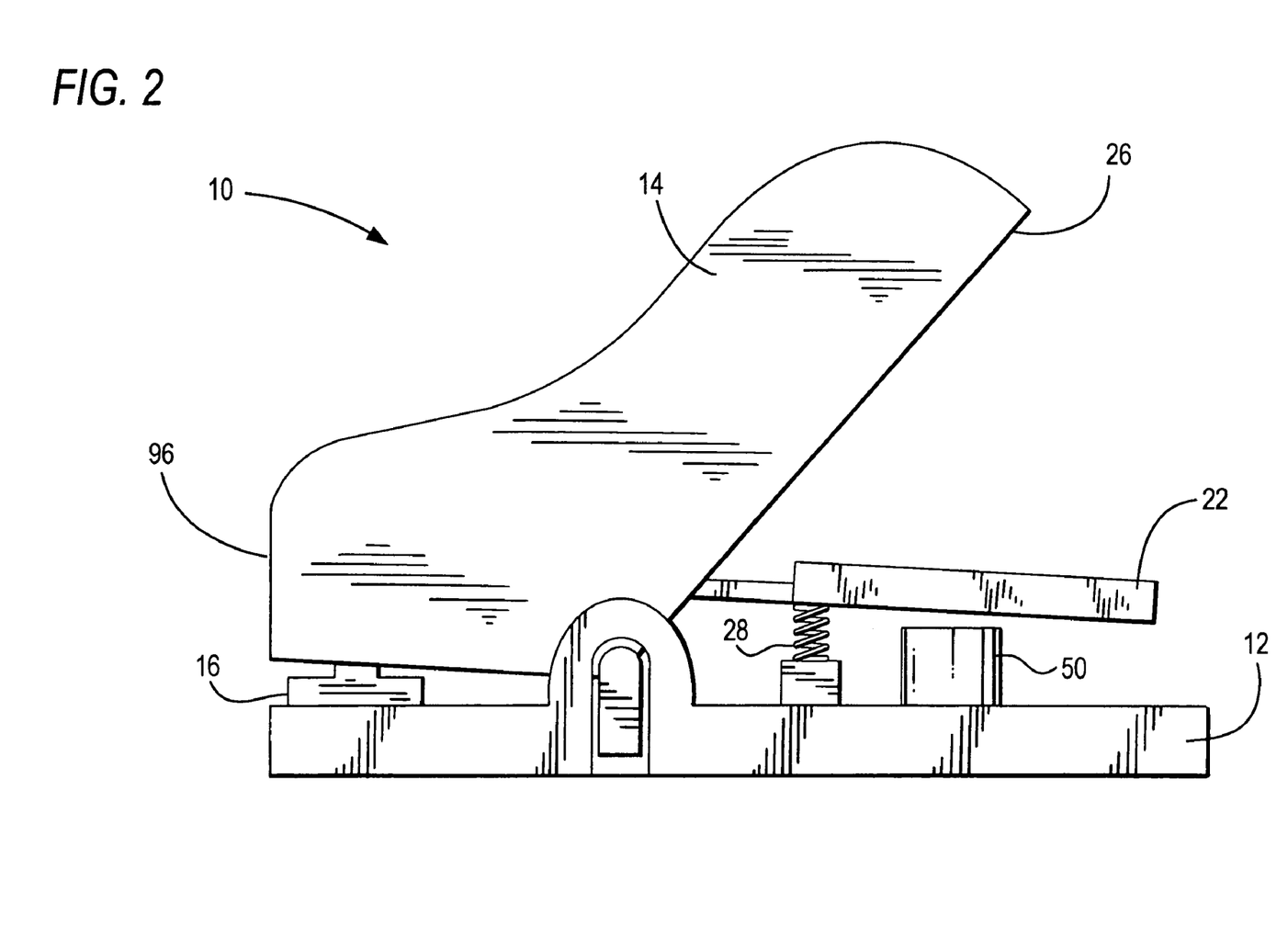
FIG. 2 is an elevation view of the rodent trap of FIG. 1.
Figure 3:
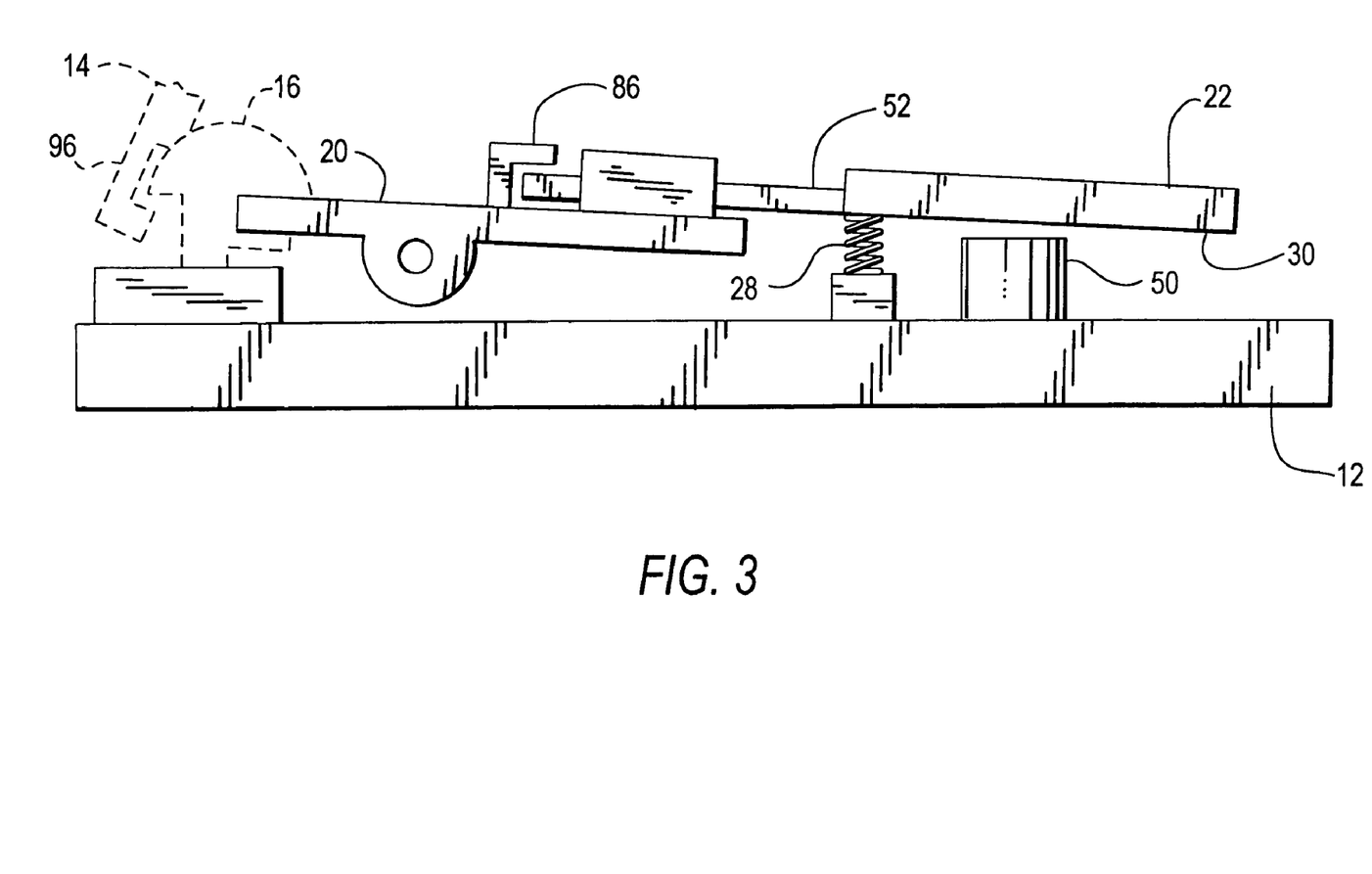
FIG. 3 is an elevation view similar to FIG. 2 with the jaw removed.

A support spring 28 is mounted on the base 12 and supports the trigger 22 in the open position shown in FIGS. 1-3. The trigger 22 support 20 is pivotally mounted on the base 12.

Figures 5, 6:
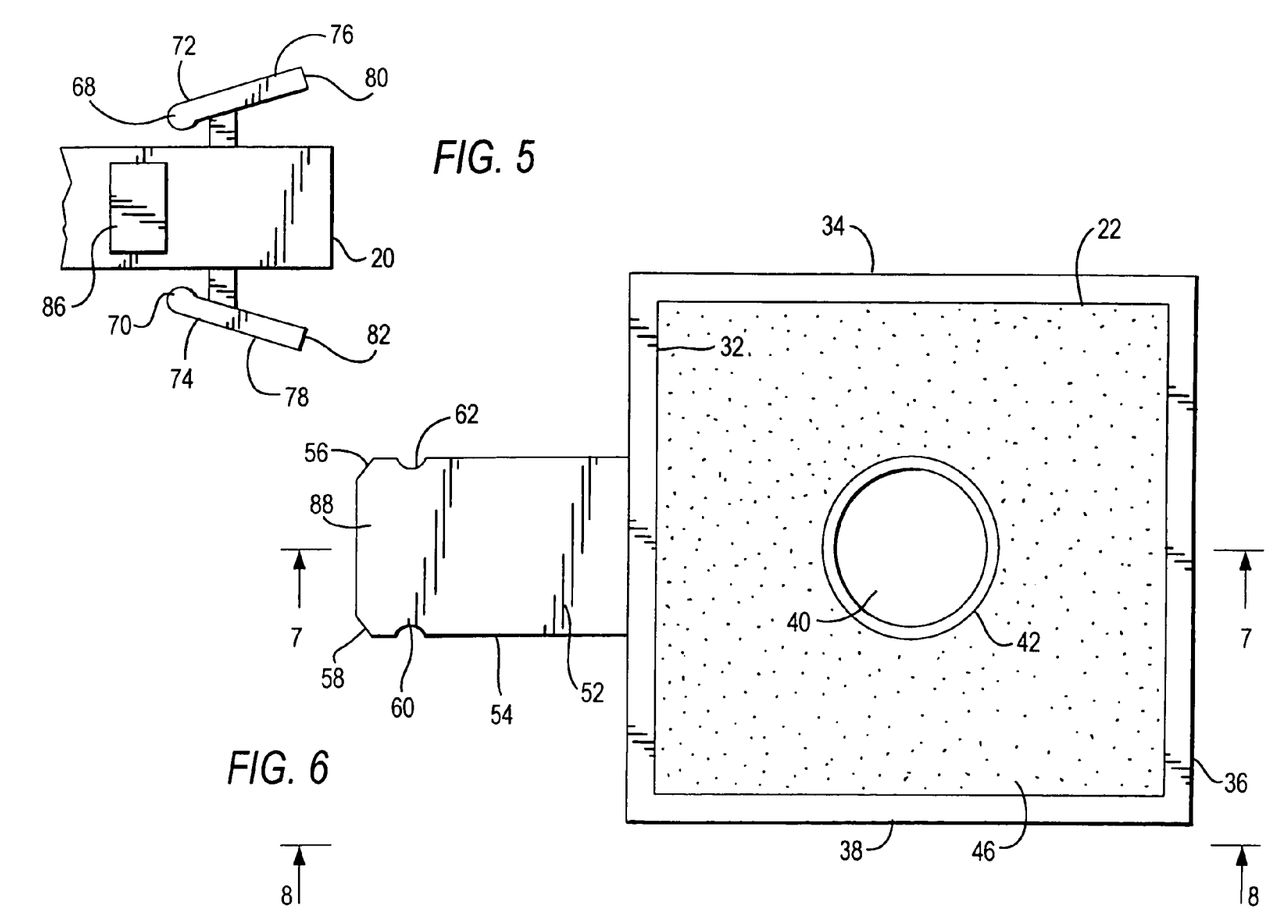
FIG. 5 is a fragmentary plan view taken along the line 5-5 of FIG. 4.
FIG. 6 is a plan view of the trigger taken along the line 6-6 of FIG. 4.
Figure 7:
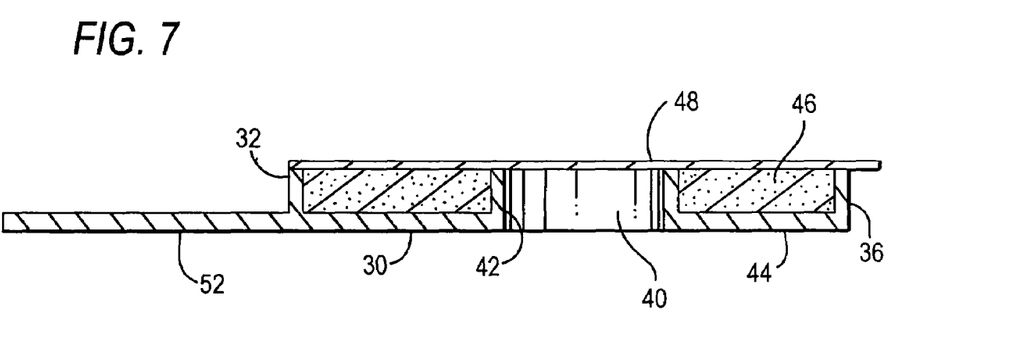
FIG. 7 is a cross-sectional view taken along the line 7-7 of FIG. 6.
Figure 8:
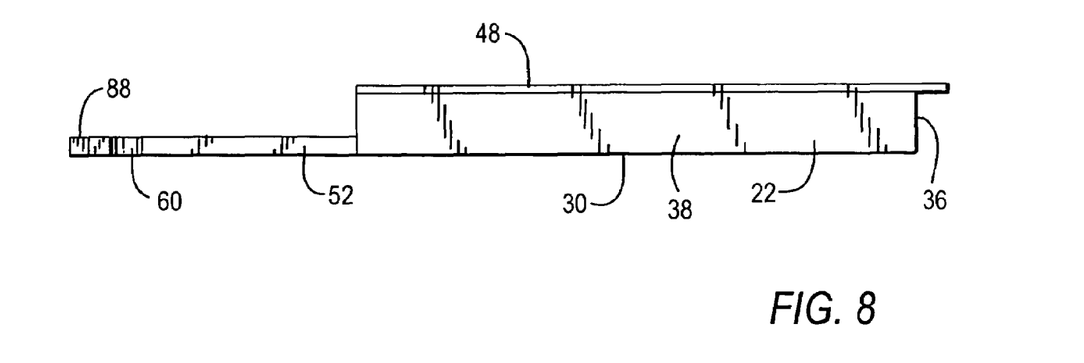
FIG. 8 is an elevation view taken along the line 8-8 of FIG. 6.

The removable trigger 22 includes a flat portion 30 which has peripheral flanges 32, 34, 36, 38 and a central aperture 40 which has a circular flange 42. The flanges 32, 34, 36, 38, 42 and the flat portion 30 form a trough 44 which may be filled with a non-drying adhesive 46. A sheet of release paper 48 covers the non-drying adhesive 46. The central aperture 40 is in general alignment with a bait cup 50 which is formed on the base 12.

The removable trigger 22 includes a projecting plate 52. The projecting plate 52 is in general alignment with the flat portion 30. The projecting plate 52 has an end 54 with a pair of tapered portions 56, 58. The projecting plate 52 includes a pair of notched portions 60, 62 disposed near the end 54.

Figure 4:
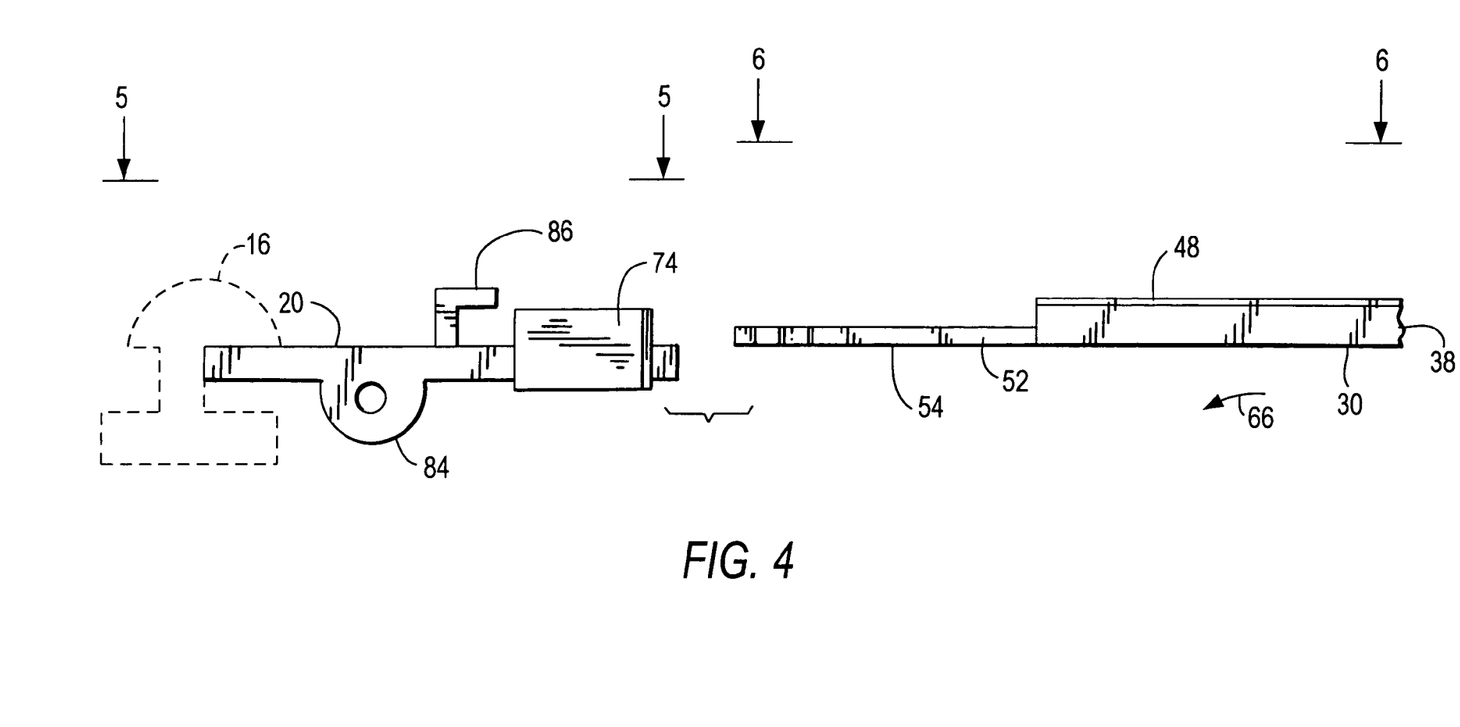
FIG. 4 is a schematic elevation view showing the trigger being inserted to the catch mechanism.

When the removable trigger 22 is pushed in the direction shown by the arrow 66 in FIG. 4 toward the catch mechanism 16, the notched portions 60, 62 engage the projecting portions 68, 70 of the latch members 72, 74 which are disposed on the trigger support 20. The latch members 72, 74 are integrally formed on the trigger support 20 and include lever portions 76, 78, the ends 80, 82 of which can be pressed together to release the removable trigger 22 from the trigger support 20 due to the flexibility of the latch members 72, 74.

The details of construction of the base 12, jaw 14, catch mechanism 16 and the load spring 18 are well known in the prior art and therefore have not been described in detail.

The trigger support 20 is connected to the base 12 pivot 84. The flange 86 engages the end portion 88.

When a rodent attempts to escape from the removable trigger 22, the motion of the rodent is transmitted to the trigger support 20 and catch mechanism 16, which has been shown schematically in FIG. 3 and the catch mechanism releases rear 96 of the jaw 14.

Figure 9:
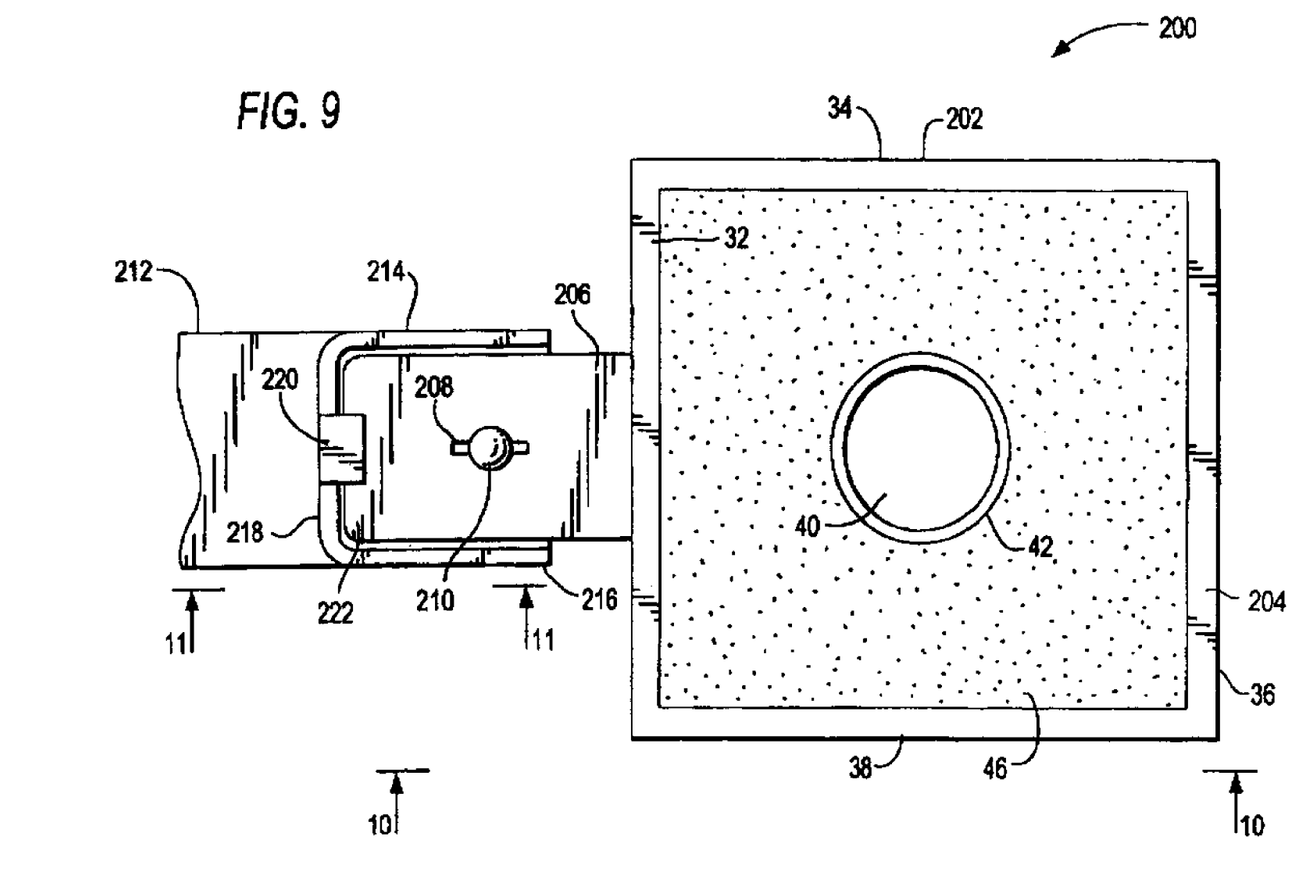
FIG. 9 is a fragmentary plan view of a second alternate embodiment of the trigger and the catch mechanism showing a snap connection to the catch mechanism.
Figure 10:
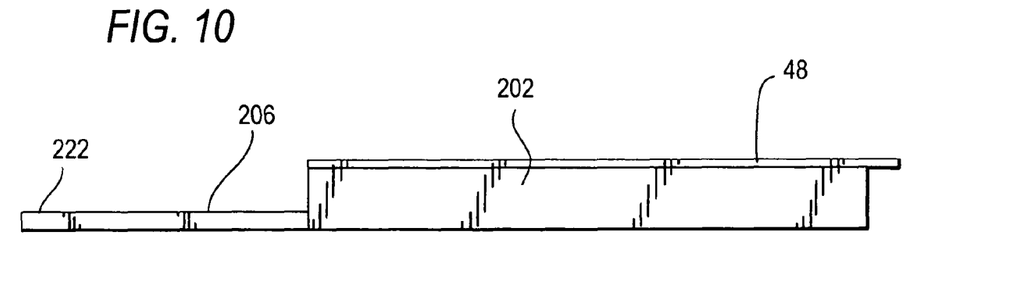
FIG. 10 is an elevation view of the trigger taken along the line 10-10 of FIG. 9.
Figure 11:
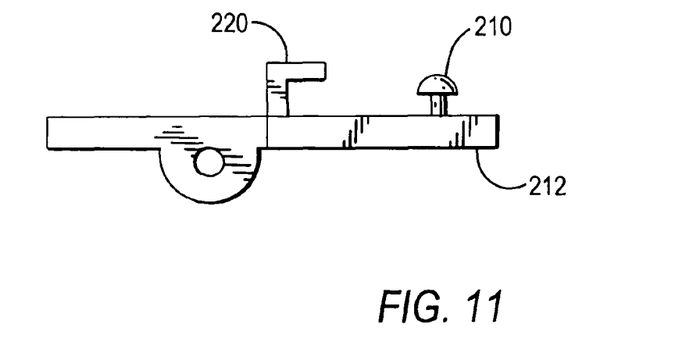
FIG. 11 is a fragmentary elevation view taken along the line 11-11 of FIG. 9.

A second embodiment of the invention 200 is shown in FIGS. 9-11. The second embodiment 200 includes a removable trigger 202 which has a trough portion 204 which is generally similar to the trough portion 44 of the first embodiment 10 previously described and a projecting portion 206 which has an aperture 208 which accepts a snap post 210. The snap post 210 projects from an alternative trigger support 220 which has integrally formed guide flanges 214, 216, 218 and an integrally formed flange portion 220 which engages the end 222 of the projecting portion 206.

A third embodiment of the invention 300 includes a removable trigger 302 which is shown in FIGS. 12-15. The removable trigger 302 has a trough portion 304 which is generally similar to the trough portion 44 of the first embodiment. The removable trigger 302 includes a projecting portion 346 which includes a pair of notched portions 306, 308. A trigger support plate 310 includes a pair of snap members 312, 314 which have projecting portions 316, 318 which snap into the notched portions 306, 308.

The trigger support plate 310 is connected to the base 12 as previously described. When the removable trigger 302 is pulled in the direction shown by the arrow 320 in FIG. 12 by a user, the snap members 312, 314 which are flexible are forced to spread apart in the directions shown by the arrows 322, 324 in FIG. 16 thereby releasing the removable trigger 302 from the trigger support plate 310.

Figure 12:
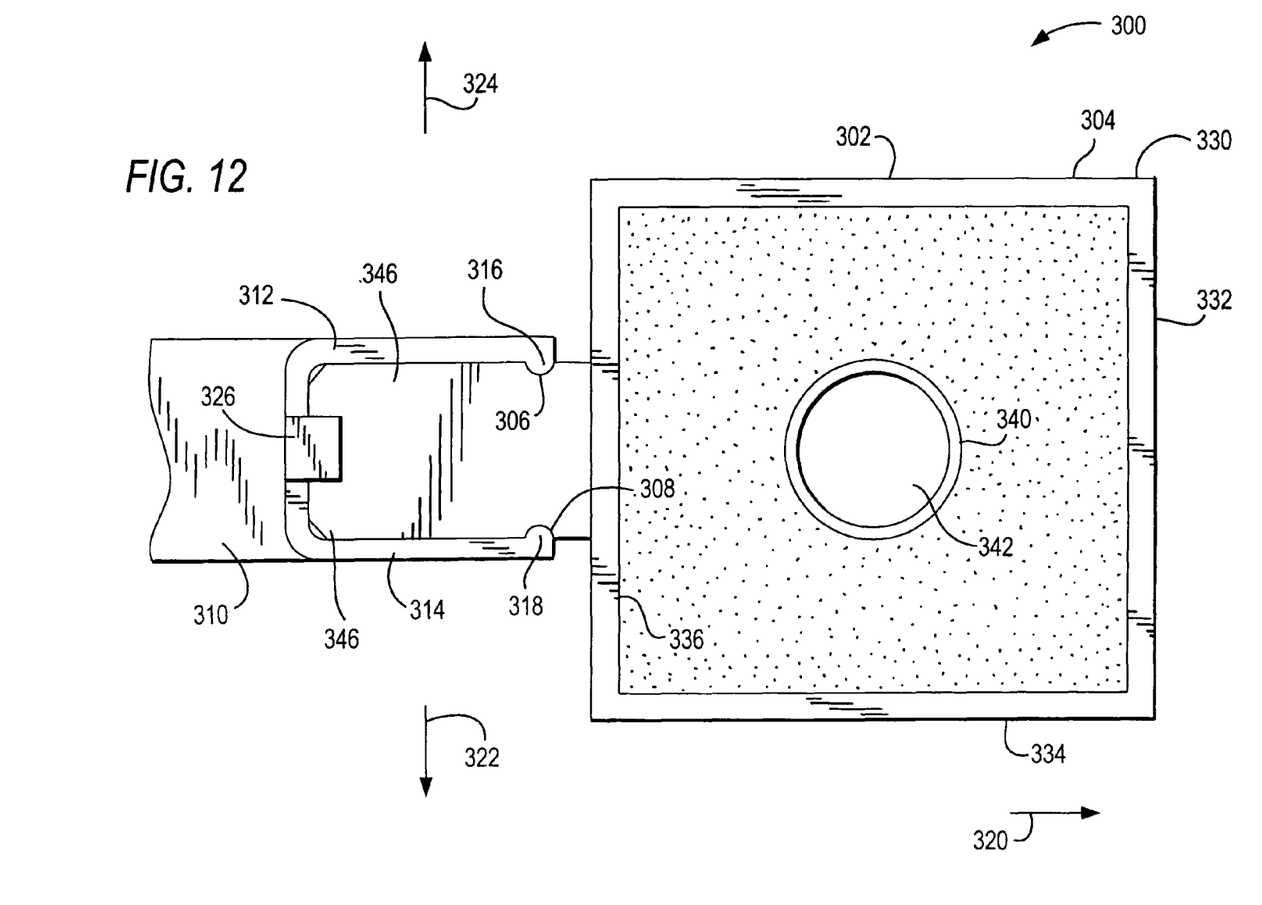
FIG. 12 is a fragmentary plan view of a third alternative embodiment of the trigger and the catch mechanism.
Figure 13:
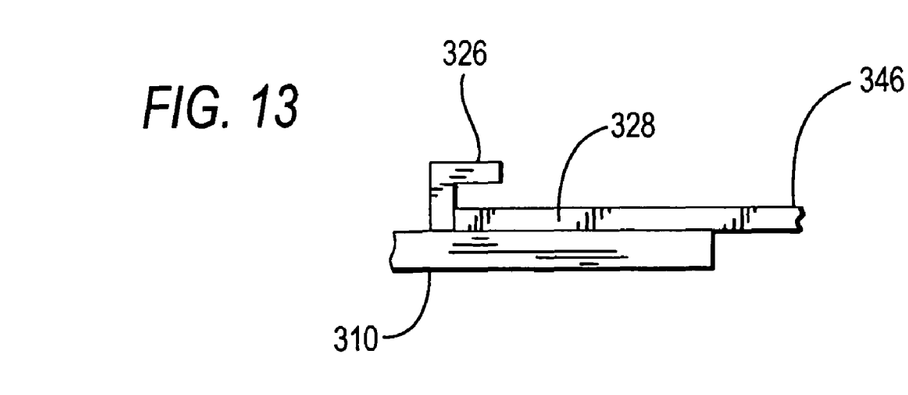
FIG. 13 is a fragmentary cross-sectional view taken along the line 13-13 of FIG. 12.
Figure 14:
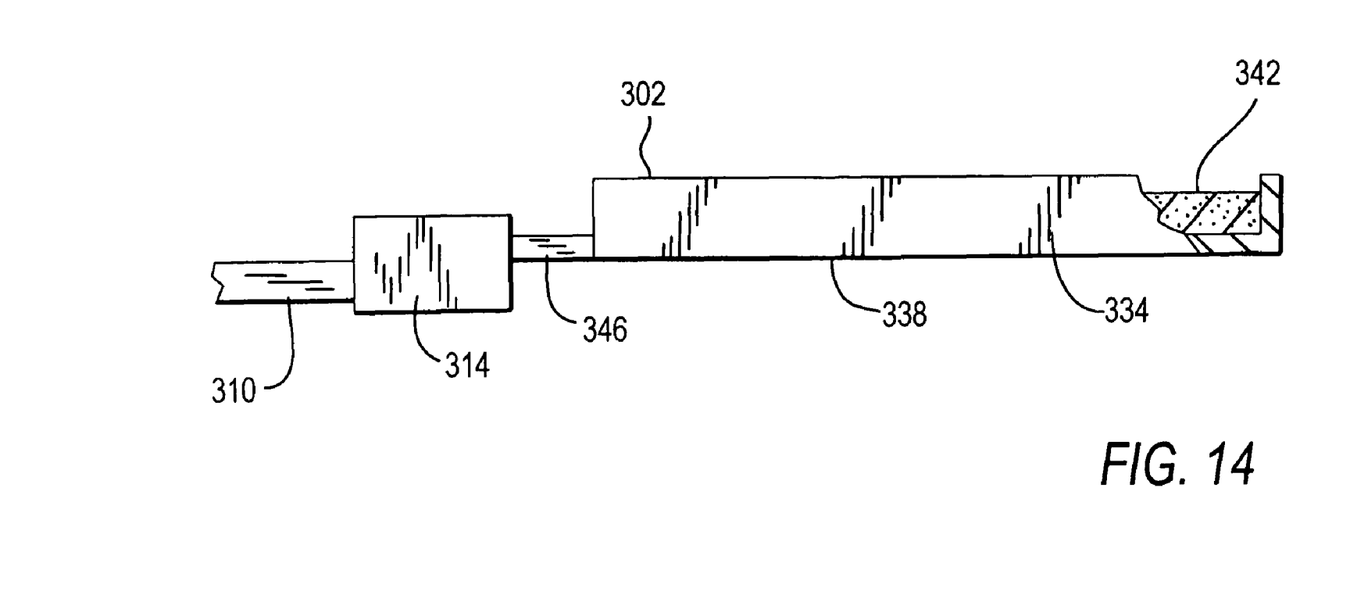
FIG. 14 is a fragmentary elevation view taken along the line 14-14 of FIG. 12.
Figure 15:
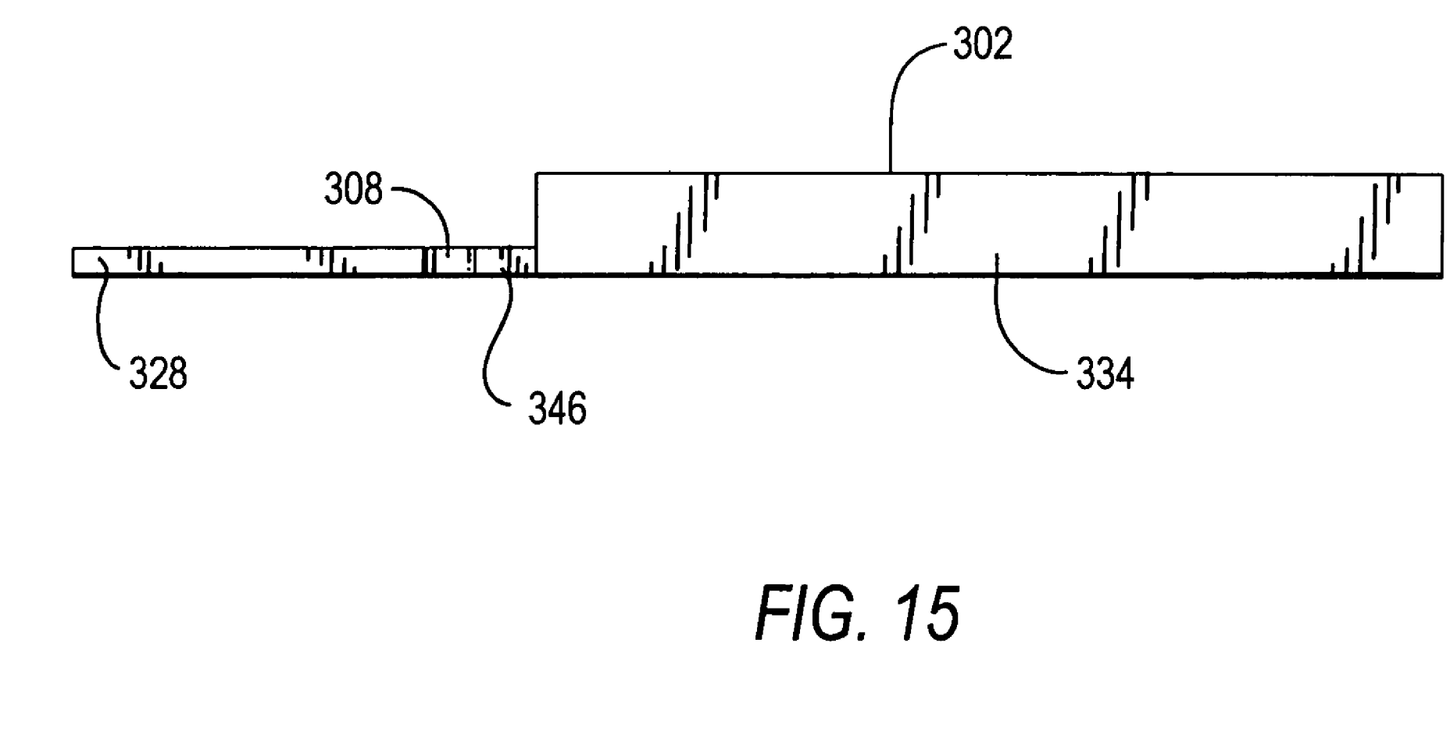
FIG. 15 is a side elevation view of the trigger plate of FIG. 12 shown removed from the trap.

The trigger support plate 310 includes a flange 326 which projects over and engages end 328 of the projecting portion 346 of the removable trigger 302.

The removable trigger 302 includes flange portions 330, 332, 334, 3346, a base portion 338, and a circular flange portion 340 which define the trough portion 304. The circular flange portion 340 defines an aperture 342. The trough portion 304 is filled with a layer of non-drying adhesive 342.

A fourth embodiment of the invention 400 is shown in FIGS. 16-19. In the fourth embodiment of the present invention 400, the base plate 402 is generally flat and includes a projecting portion 404. The projecting portion 404 is generally similar to the projecting portion 346 previously described and includes notched portions 406, 408 which engage projecting portions 410, 412 on the flexible members 414, 416 which are part of the support member 418 as previously described. The support member 418 includes a flange 420 which engages the end 422 of the projecting portion 404. The support member 418 is pivotally connected to the base 12 and actuates the catch mechanism 16 to release the jaw 14 as previously described.

Figure 16:
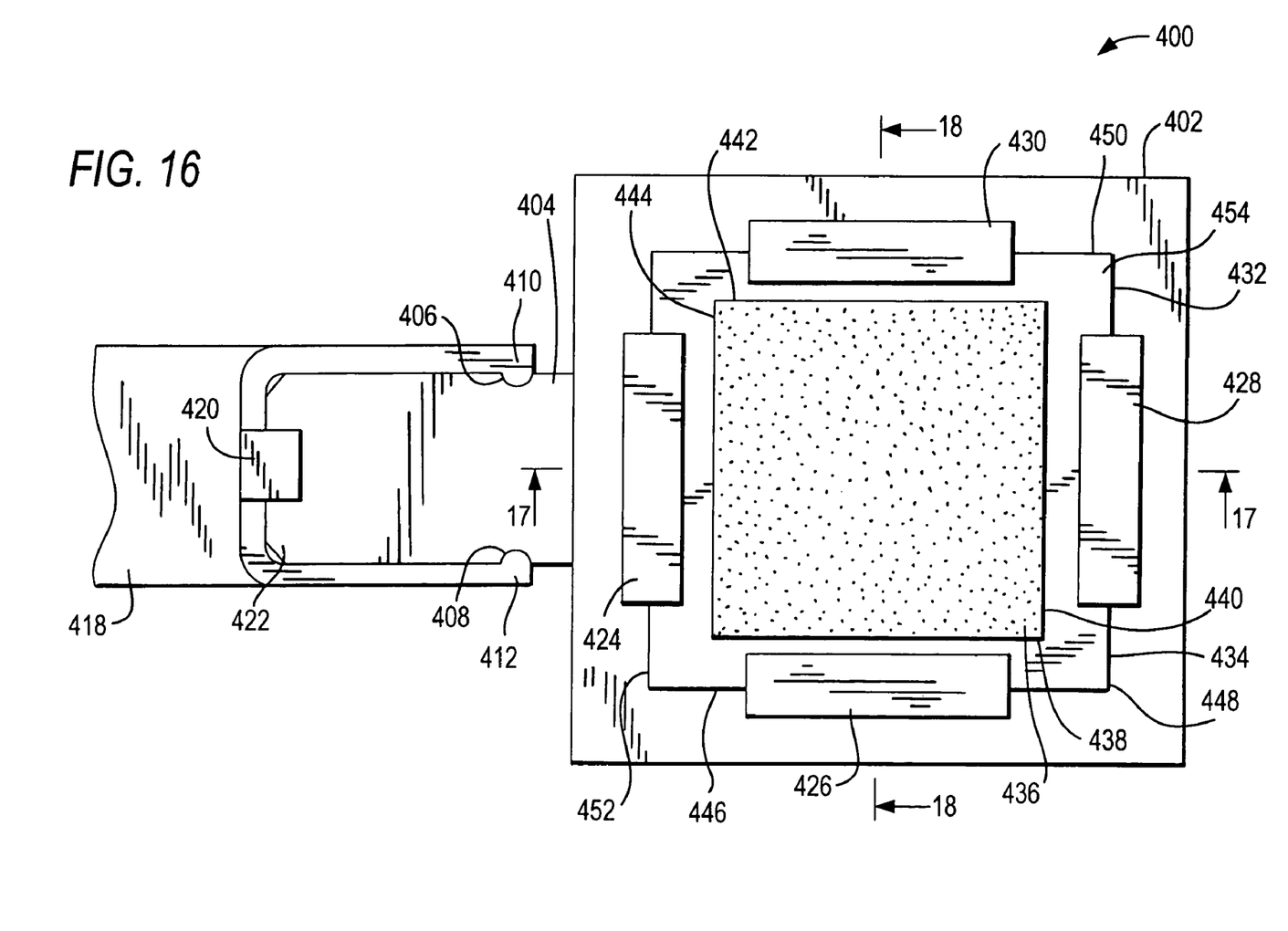
FIG. 16 is a fragmentary plan view of a fourth alternative embodiment of the trigger and catch mechanism incorporating a removable glue board member.
Figure 17:
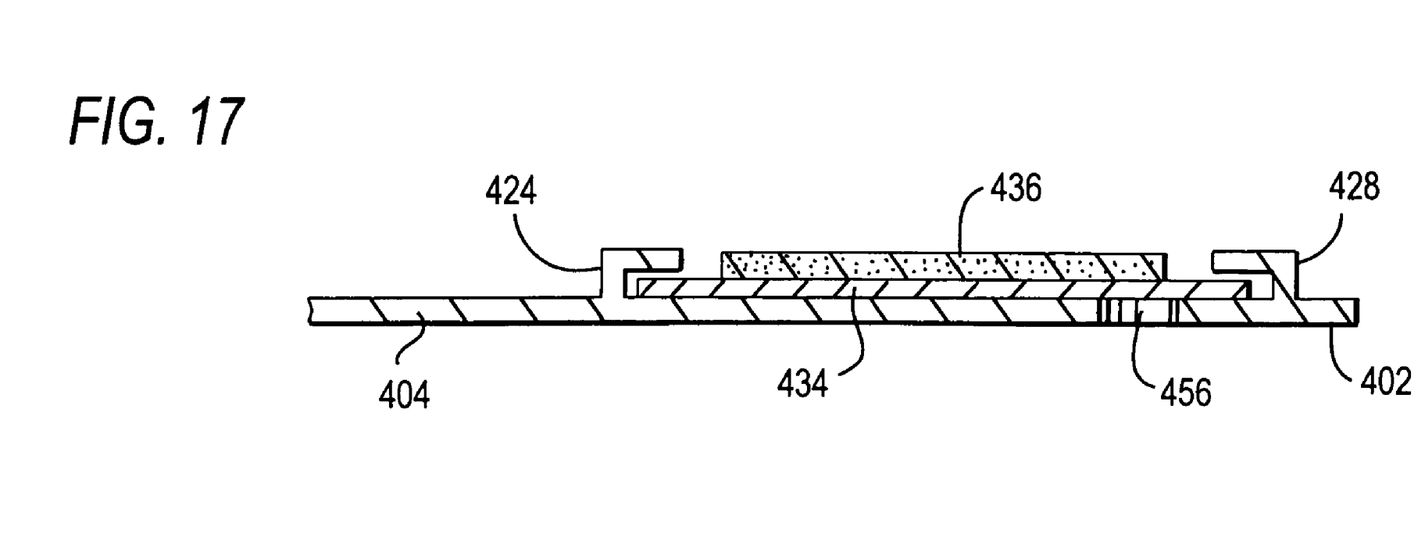
FIG. 17 is a fragmentary cross-sectional view taken along the line 17-17 of FIG. 16.
Figure 18:
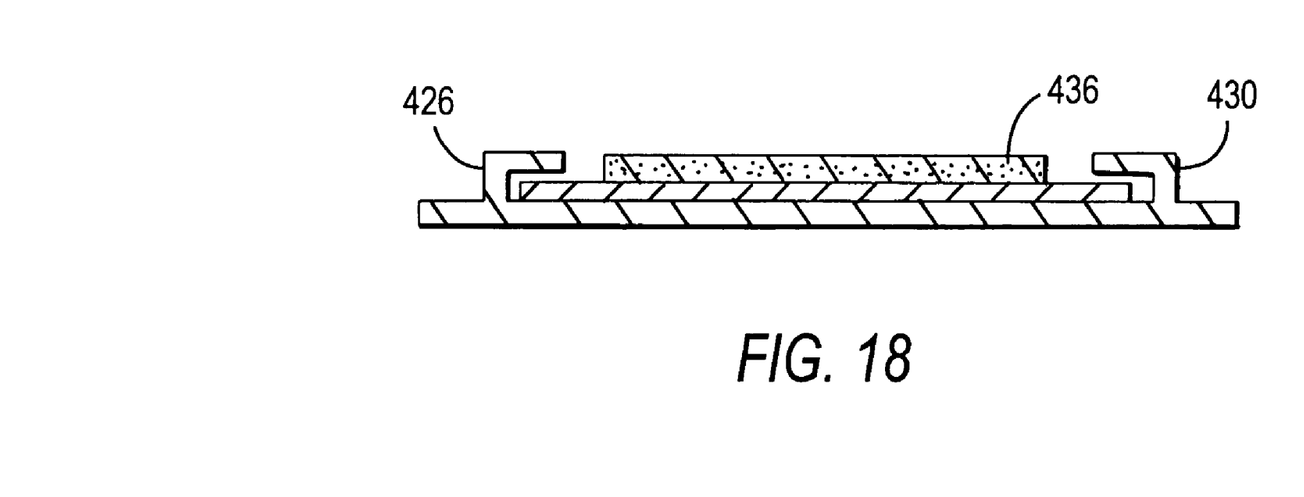
FIG. 18 is a fragmentary cross-sectional view taken along the line 18-18 of FIG. 16.

The base plate 402 includes flanges 424, 426, 428, 430 which engage and hold a removable glue board 432. The glue board 432 has a flexible cardboard member 434 and a non-drying adhesive layer 436. The edges 438, 440, 442, 444 of the non-drying adhesive layer 436 are spaced away from the edges 446, 448, 450, 452 of the cardboard member 434 leaving a border 454 which engages the flanges 424, 426, 428, 430 and which is free of adhesive.

The border 454 on the glue board 432 ensures that the glue board 432 will not adhere to the flanges 424, 426, 428, 430.

Figure 19:
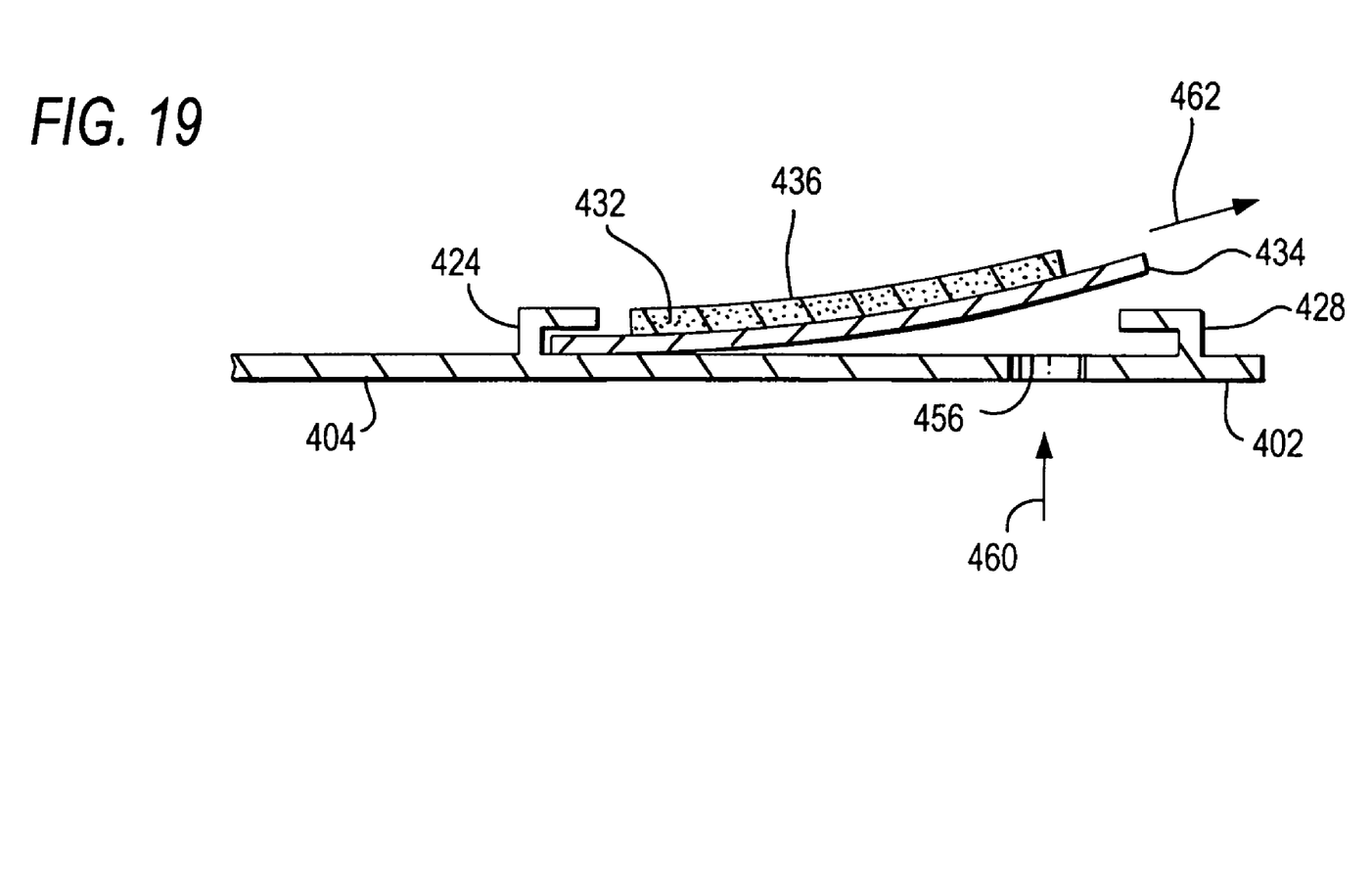
FIG. 19 is a fragmentary cross-sectional view similar to FIG. 17 showing the removal of the removable glue board member.

The base plate 402 includes an aperture 456. To remove the glue board 432, the bottom 458 of the glue board 432 is pressed in an upward direction by the user in the direction shown by the arrow 460 in FIG. 19. The glue board 432 flexes past the flange 428 and can be easily removed in the direction shown by the arrow 462 along with an entrapped rodent. The glue board 432 is proportioned to flex past the flange 428 as shown in FIG. 19. However, if a rodent attempts to escape by pulling the glue board 432, the glue board slides under the flange 428 and is retained on the base plate 402.

Figure 20:
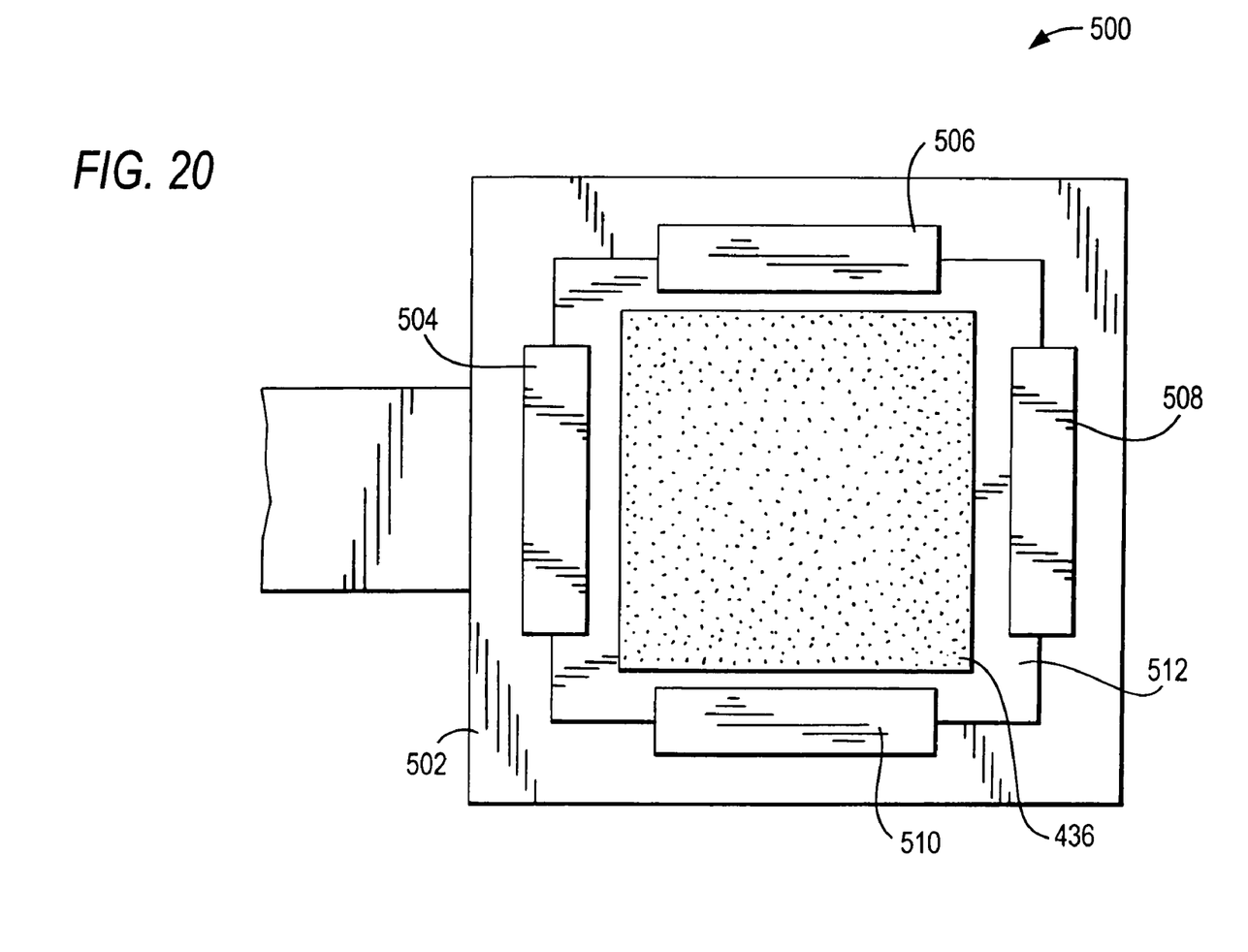
FIG. 20 is a fragmentary plan view similar to FIG. 16 of a fifth alternative embodiment of the invention.

A fifth embodiment of the invention 500 is shown in FIG. 20. The fifth embodiment of the invention 500 is generally similar to the fourth embodiment 400 of the invention previously described with the exception that the base plate 502 is pivotally connected to the base 12 and the flexible members 414, 416 have been eliminated. The flanges 504, 506, 508, 510 are as previously described and the glue board 512 is removable as previously described.

The foregoing specific embodiments of the present invention as set forth in the specification herein are for illustrative purposes only. Various deviations and modifications may be made within the spirit and scope of this invention, without departing from a main theme thereof.

What is claimed is:

1. A rodent trap with removable trigger member comprising:
   a base member;
   a trigger support;
   a trigger member;
   a catch mechanism with said catch mechanism mounted on said base member, with said trigger support connected to said catch mechanism, a jaw member with said jaw member having integral sides, with said jaw member pivotally connected to said base member, with said jaw member having a first position wherein said trigger member is generally exposed and a second position wherein said trigger member is generally covered by said jaw member, wherein said jaw member is connected to said catch mechanism, wherein said catch mechanism drives said jaw member from said first position to said second position responsive to motion of said trigger member;

a first connection between said trigger member and said catch member via said trigger support; and a second connection removably connecting said trigger support and said trigger member, wherein said trigger member further comprises a trough portion and an adhesive layer disposed in said trough portion, and wherein said second connection removably connecting said trigger support and said trigger member comprises a notched portion and at least one catch portion removably engaging said notched portion, wherein said second connection removably connecting said trigger support and said trigger member comprises: a pair of outwardly flexible arms formed on said trigger support, each of the arms having an enlarged catch portion at one end of each arm and a pair of recessed portions formed on said trigger member corresponding to said catch portions on said pair of flexible arms.

2. The rodent trap as claimed in claim 1 wherein said trough portion comprises a plurality of upwardly directed flange portions.

3. The rodent trap claimed in claim 1 wherein said second connection removably connecting said trigger support and said trigger member comprises a snap connection.

4. The rodent trap as claimed in claim 1 further comprising: a release layer disposed on said adhesive layer.

* * * * *